Dec. 6, 1938.  G. L. OLSON  2,139,560
VARIABLE SPEED TRANSMISSION
Filed Feb. 9, 1937  4 Sheets-Sheet 1

Inventor.
Gordon L. Olson
by Ernest R. Llewellyn
Atty.

Dec. 6, 1938.   G. L. OLSON   2,139,560
VARIABLE SPEED TRANSMISSION
Filed Feb. 9, 1937   4 Sheets-Sheet 2
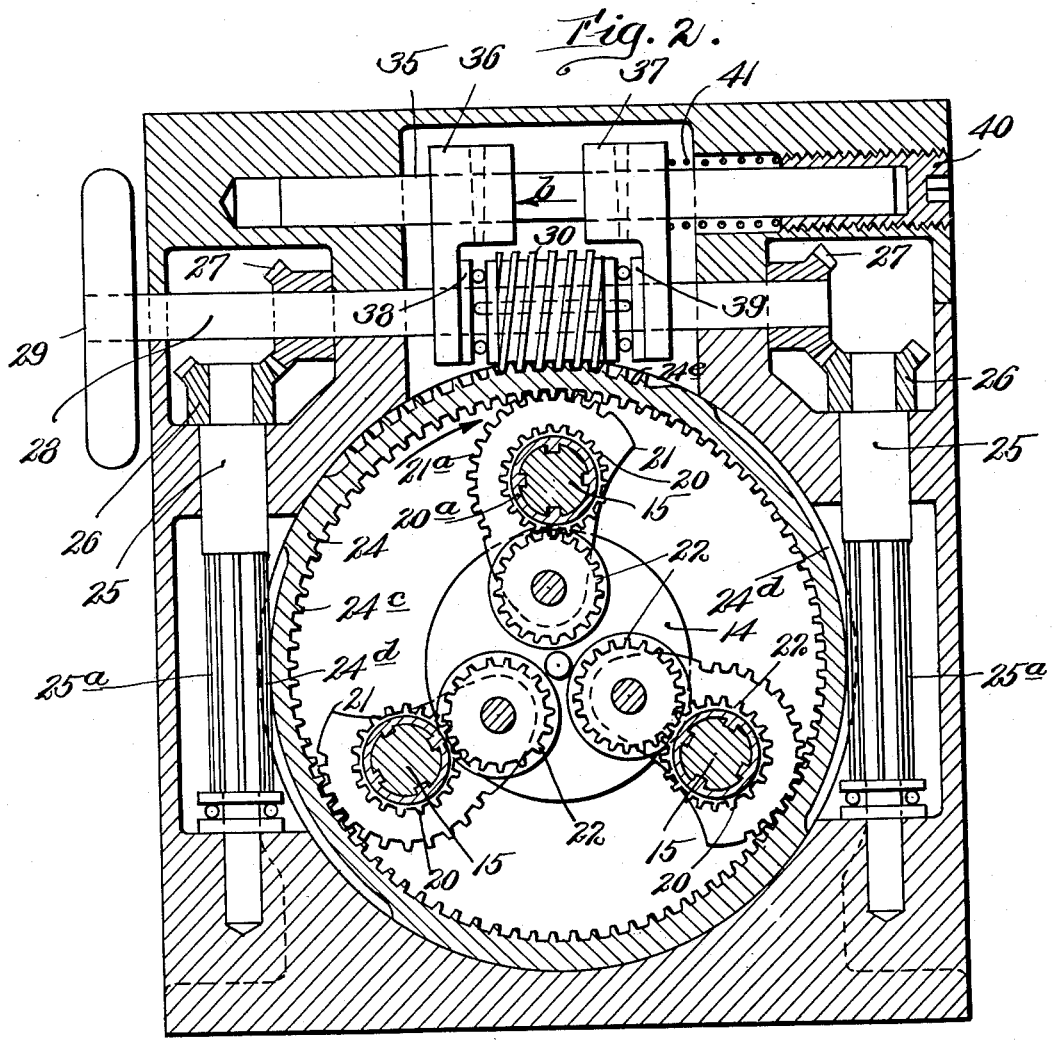
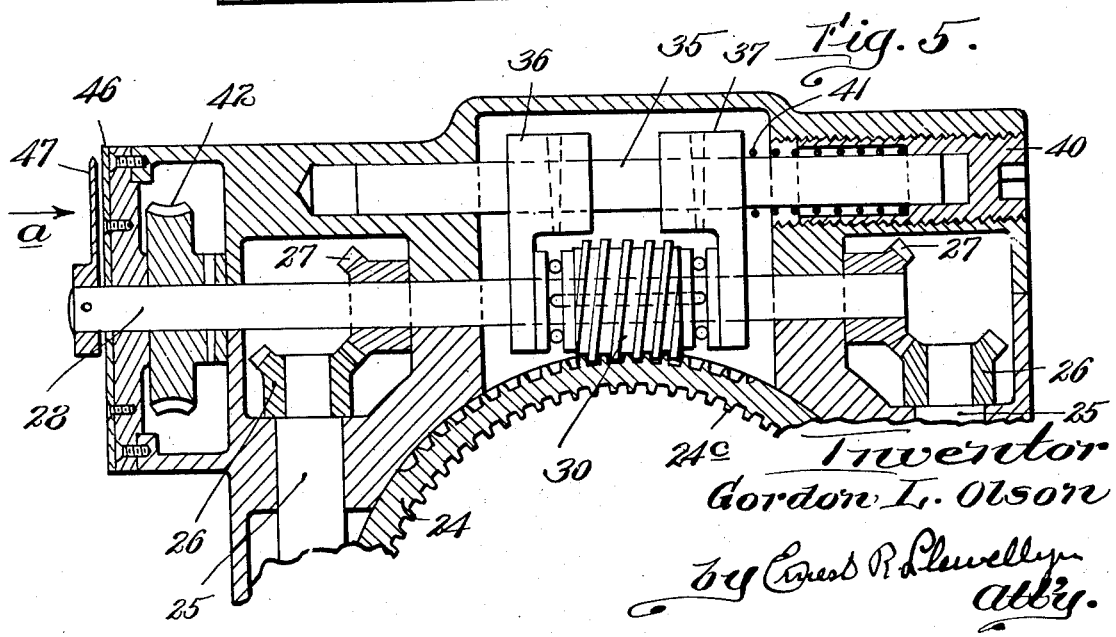
Inventor
Gordon L. Olson Dec. 6, 1938. G. L. OLSON 2,139,560
VARIABLE SPEED TRANSMISSION
Filed Feb. 9, 1937 4 Sheets-Sheet 3

Inventor
Gordon L. Olson
by Ernest R. Llewellyn
Atty.

Dec. 6, 1938.  G. L. OLSON  2,139,560
VARIABLE SPEED TRANSMISSION
Filed Feb. 9, 1937  4 Sheets-Sheet 4
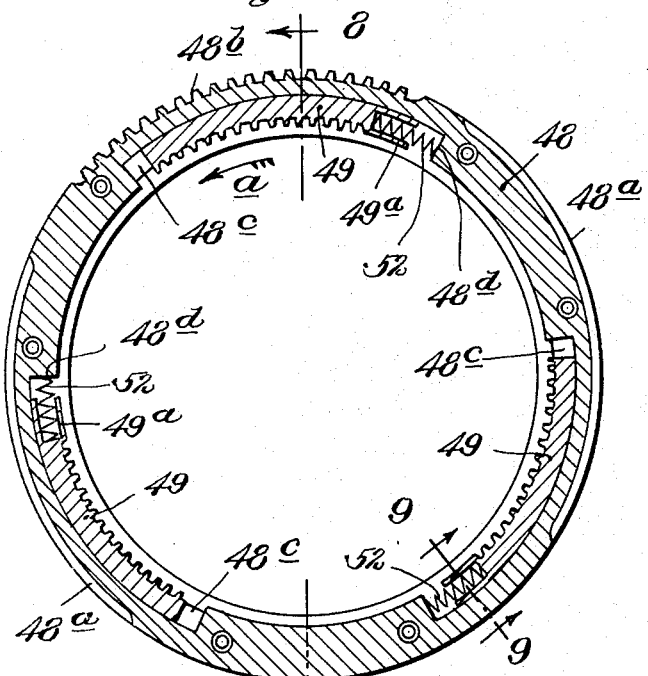
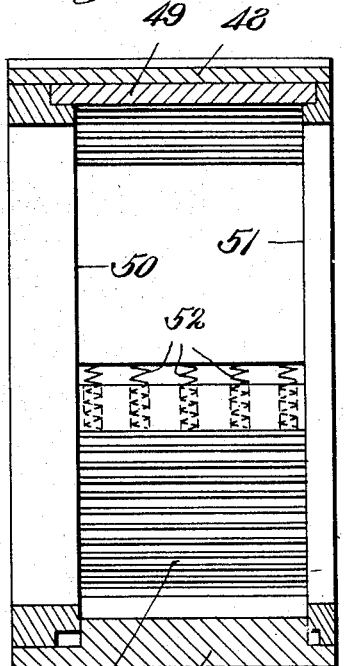
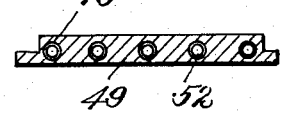
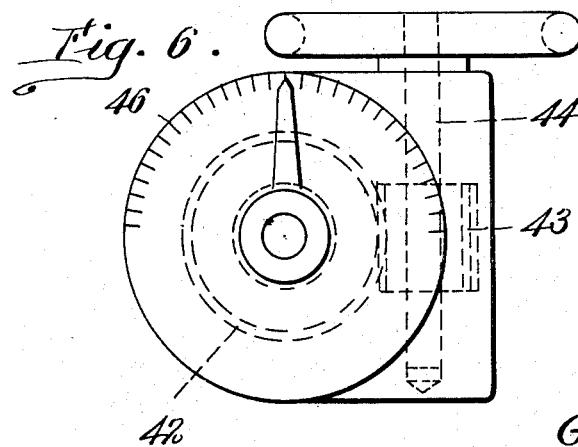

Patented Dec. 6, 1938

2,139,560

UNITED STATES PATENT OFFICE 2,139,560

VARIABLE SPEED TRANSMISSION

Gordon L. Olson, Arlington, Mass.

Application February 9, 1937, Serial No. 124,836

16 Claims. (Cl. 74—191)

This invention relates to mechanical power transmissions and to power transmissions of the variable speed type and speed varying mechanisms having a selective speed varying range from its minimum to its maximum.

It is well known that cones have been employed in variable speed transmissions. In typical devices of this character, a shaft has been disposed parallel to the angle face of the cone and carrying an element slidable on this shaft and adapted to operatively engage with the peripherial face of the cone. Variable speed devices of this character require driving connections between the variable speed driven shaft, carrying the slidable element and a shaft to be driven which is usually disposed parallel to the axis of the cone. A typical arrangement of this type of a variable speed transmission is shown and described in U. S. Letters Patent No. 1,443,991 issued February 6, 1923.

For various reasons and particularly for convenient applications of variable speed transmissions, it is desirable to use parallel driving and driven shafts. To effect this desired arrangement, it has been a common practice in the art to use a pair of parallel shafts each having a cone member oppositely disposed. A shiftable belt or suitable device is provided to operatively engage the cones in relation to one another and movement of the belt longitudinally of the cones varies the rotative speed of the driven shaft relative to the driving shaft.

In a device of the above character wherein elements are frictionally driven, there is a common problem of eliminating inherent slippage to a satisfactory degree and further, heretofore these devices have not been adaptable to a compact arrangement in accordance to their driving power capacity.

Accordingly one of the objects of the present invention is to provide an infinitely variable parallel shaft speed transmission that may be arranged as a unit and in such a compact form that may be readily adapted to various uses and conditions.

Another object of my invention is to provide a variable speed transmission wherein the speeds may be conveniently and infinitely varied as desired.

A further object of the invention is to provide a device of the referred to character having the variable driving elements engaging in a substantially positive relation.

A still further object of my invention is to provide a variable speed transmission having a variable friction cone drive that may be arranged to be engaged and disengaged in the manner of an operating clutch.

The above is intended to generally explain the objects of my invention and is not to be construed as a limitation as other objects will be obvious from the following description which comprises a novel combination and arrangement of parts as more specifically pointed out in the appended claims.

In the accompanying drawings I have illustrated a preferred form of my invention sufficient to enable those skilled in the art to understand the construction thereof.

Referring to the drawings:—

Fig. 2 is a transverse section taken substantially along line 2—2, Fig. 1.

Fig. 5 shows a modified form of my speed adjusting mechanism.

Fig. 6 is an end view of a portion of the device shown at Fig. 5, viewing in the direction of arrow $a$, same figure.

Fig. 7 is a sectional elevation of a modified form of my ring gear or annulus.

Fig. 8 is a section taken substantially along line 8—8, Fig. 7, and

Fig. 9 is a section taken substantially along line 9—9, Fig. 7.

The power input

Figure 1:
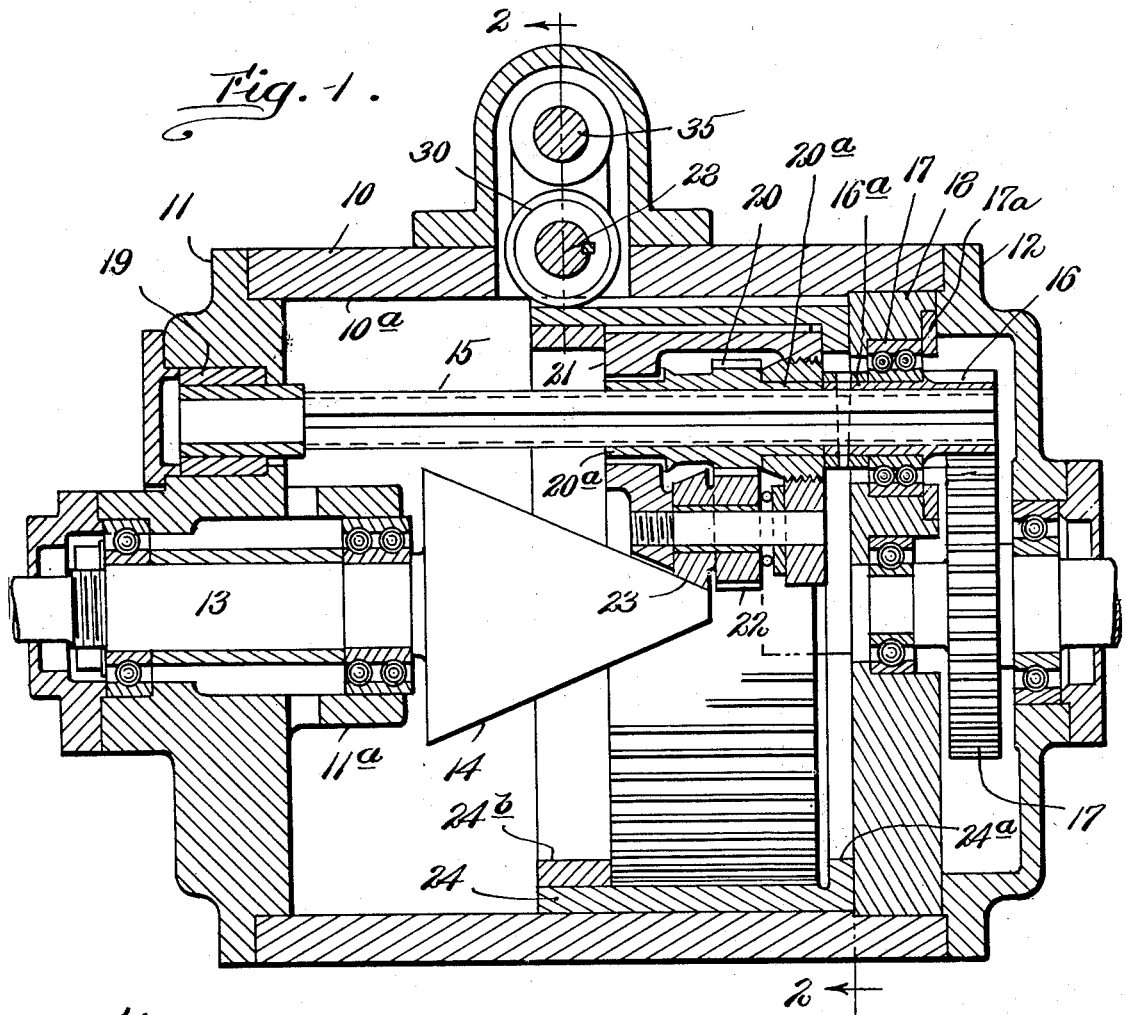
Fig. 1 is a longitudinal sectional elevation of my variable speed device.

As illustrated by the drawings, the housing 10 is provided with an enlarged bore 10a and opposed end plates 11, 12. The left hand end plate 11, is provided with a hub 11a adapted to rotatively support one end of the drive or power input shaft 13 which may be operated from any suitable source of power.

The drive shaft 13 has a cone member 14 secured thereto altho it is obvious that the cone could be disposed separate from the shaft 10 and actuated thereby. This cone member is provided with a suitable peripherial driving face for a purpose hereinafter described.

Intermediate drive

In my preferred form I provide a plurality of intermediate drive shafts 15 but it will be obvious from the following description that a single intermediate shaft may be used in a modified form of my device. Each shaft 15 has a pinion 16 secured to one end thereof and these pinions are provided with hub portions 16a rotatably supported in suitable bearings 17 in an end plate 18 seated in the housing 10 and the bearings are retained in position by locking members 17a disposed between the plate 18 and the housing end plate 12. The opposite ends of the intermediate shafts 15 are rotatably mounted in suitable bearings 19 in the opposed housing end plate 11. These shafts are radially positioned relative to the axis of the driving cone 14 and extend parallel therewith longitudinally within the housing bore 10a.

Slidably keyed to each of the intermediate drive shafts 15 is a pinion 20 provided with opposed end hubs 20a. Each pinion 20 is associated with a carriage member 21 which is rockably supported on the hubs 20a thereof. These carriages 21 rotatably support a pinion 22 that meshes with the intermediate shaft pinion 20. The pinions 22 have truncated cone portion 23 which are adapted to be operatively engaged in a driving relation with the cone 14 and in turn rotate the pinions 22, 20 and intermediate drive shaft 15.

Infinite variable control

An operating annulus 24 is rotatably and slidably mounted in the housing chamber 10a and is provided with inwardly extending flange portions 24a, 24b which engage with the opposed end faces of the carriage 21. The inner face of this annulus is provided with engaging teeth 24c that enmesh with a segment of teeth 21 formed in the carriages. The opposed outer side faces of the annulus 24 are provided with circular segmental racks 24d which enmesh with vertically disposed pinions 25a in this instance formed integral with shafts 25 that are rotatably supported in suitable bearings in the housing 10.

A bevel gear 26 is secured to the upper end of each of the shafts 25 and these gears 26 enmesh with corresponding gears 27 secured to a horizontally extending operating shaft 28 also rotatably mounted in suitable bearings in the housing 10 and extending therefrom to receive an operating wheel 29 by means of which the shaft 28 may be rotated.

The shaft 28 is provided with a worm 30 which, for a purpose hereinafter mentioned, is slidably keyed to the shaft. This worm 30 meshes with a helical gear segment 24e formed in the upper outer face of the annulus 24.

Operation

As the shaft 28 is rotated, the worm 30 causes rotary movement of the annulus 24 and simultaneously, through the bevel gears 26, 27, the spur pinions 25a cause the annulus 24 to be moved longitudinally within the housing bore 10a. The helical gear segment 24e, spur gears 25a and their associated elements are so proportioned and designed that the combined rotary and longitudinal movement of the annulus 24 is effected in a direct relation to the angle of the face of the driving cone 14 or, as may be conveniently stated, the annulus is moved in a helix angle in a direct relation to the angle and diameter of the face of the driving cone 14.

At Figs. 1 and 2 the truncated cones 23 are shown in engagement with the minimum diameter portion of the driving cone 14 and thru the pinions 22, 20 the shaft 15 is rotated in a direct relation to the peripheral speed of this portion of the driving cone 14.

As the annulus 24 is actuated in the direction of the arrow Fig. 1., as aforesaid, the internal teeth 24c will rock the carriages 21 in a direct relation to the increase in diameter of the driving cone and the carriage will be moved longitudinally along its shaft 15 by the annulus flanges 24a, 24b.

Figure 3:
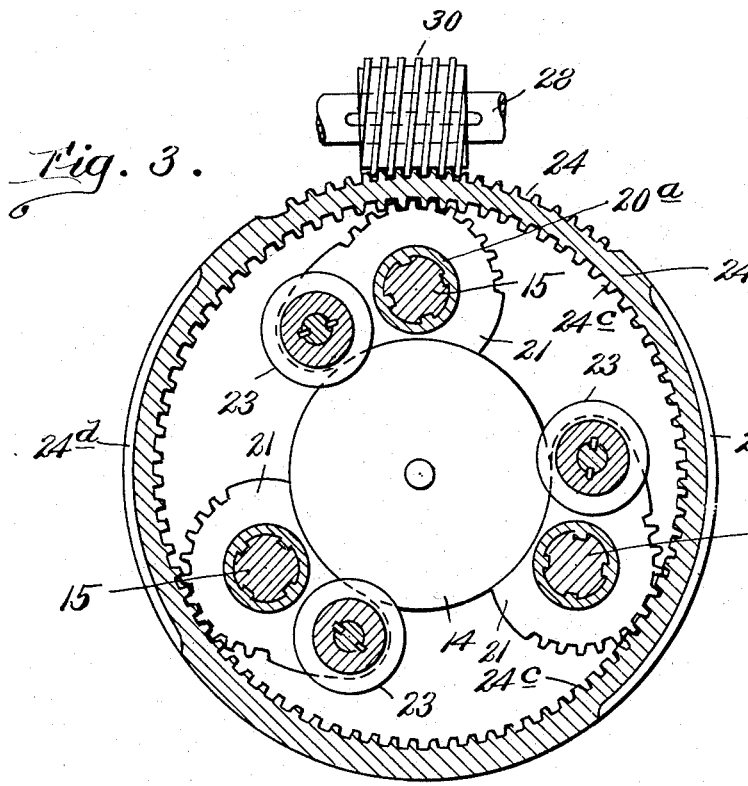
Fig. 3 is a partial view corresponding to Fig. 2, but shows some of the parts in a different position.
Figure 4:
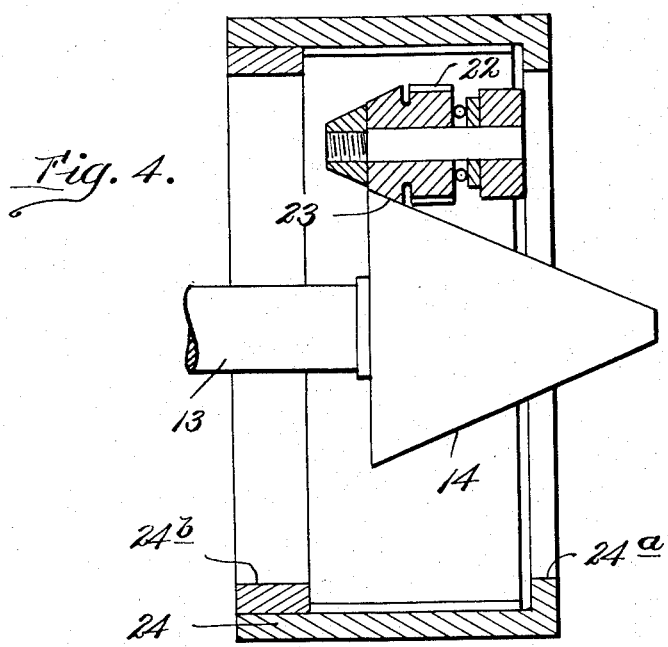
Fig. 4 is a partial sectional view corresponding to Fig. 1 but shows some of the parts positioned as illustrated at Fig. 3.

At Figs. 3 and 4 the carriages 21 are shown with the truncated cones 23 moved to their engaging position with the large diameter of the driving cone 14.

When the annulus is moved conversely to the arrow Fig. 1, the carriage and parts will be moved from their positions as shown at Figs. 3 and 4 toward the positions shown at Figs. 1 and 2.

In the above manner the carriage 21 and its truncated cone 23 and drive may be positioned by infinite degrees in engagement along the angular face of the driving cone 14 and the intermediate drive shaft 15 will be rotated in a direct relation to the peripheral speed of the portion of the driving cone 14 with which the truncated cone 23 is engaged.

Adjustable yielding contact pressure

To assure a degree of pressure contact between the driving cone 14 and truncated cone 23, I have provided a shaft 35 that is mounted for longitudinal movement relative to the adjusting worm 30. This shaft 35 has secured thereto a pair of members 36, 37 that substantially form a yoke adapted to closely engage with thrust bearings 38, 39 engaging with the opposed ends of the worm. One end of the shaft 35 has a sliding bearing in an adjusting nut 40 threadedly engaging in the housing 10. A compression spring 41 encircles the shaft 35 and has a bearing at one end against the adjusting nut 40, its opposed end bearing against the shaft member 37 and thus yieldingly forces the shaft 35 and its coacting members in direction of the arrow b.

The above mentioned pressure against the worm 30, through its engaging teeth, causes a pressure to be exerted on the annulus 24 in a contra-clockwise direction and thus, through the enmeshing teeth 21a, 24c of the annulus 24 and carriage 21, the face of the truncated cone 23 is urged into close contact with the face of the driving cone 14. The degree of pressure may be regulated by means of the adjusting nut 40 that engages with one end of the compression spring 41.

Modified variable speed adjustment

At Figs. 5 and 6 I have illustrated a modified and convenient form of speed adjustment. In this modification the shaft 28 has a worm gear 42 secured thereto that meshes with a worm 43 secured to an operating shaft 44 provided with a dial 46 graduated to correspond with various speeds that may be obtained through rotation of the adjusting shaft which is provided with an indicator hand 47 disposed to register with the graduated dial 46.

A modified form of the actuating annulus

At Figs. 7 and 8 I have shown a modified form of annulus 48 adapted to be disposed in the housing bore 10a and rotatably and longitudinally movable therein. The opposed outer side faces of this annulus 48 are provided with circular segmental racks 48a which are adapted to enmesh with the pinions 25, and the upper outer face of this annulus is provided with a helical gear segment 48b.

The inner face of this annulus 48 is provided with recesses 48c positioned to receive gear segments 49 which are adapted to enmesh with the teeth 21a formed in the carriages 21. These segments 49 are slidably retained in their recesses 48c by means of inwardly extending side flanges 50, 51 that are secured to the annulus 48.

Each gear segment 49 is provided with bores 49a each having a compression spring 52 therein, one end of said springs having their bearings within the bores 49a and their opposed ends bearing against the end walls 48d. These springs 52 urge the segments in the direction of arrow a, Fig. 7, and, when the annulus 48 is in operative position, this pressure is exerted against the carriage teeth 21 and communicated to the truncated cone 23 and thus provides the cone 23 with a yielding pressure contact. Further, these yielding segments also compensate for slight inaccuracies in the various teeth or structure.

The variable speed clutch

Figure 11:
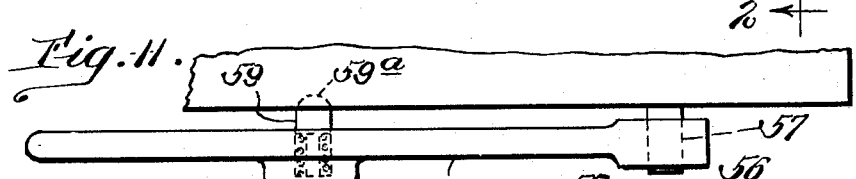
Fig. 11 illustrates a preferred form of clutch control lever.
Figure 10:
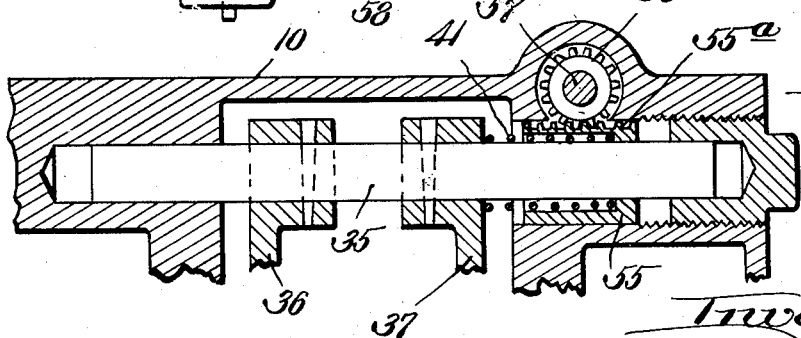
Fig. 10 is a sectional view of my clutch actuating device.

At Figs. 10 and 11 I have illustrated a preferred form of a clutch structure for selectively effecting an engaging and disengaging relation between the driving and driven elements of my device.

In this clutch arrangement the yoke supporting shaft 35 is mounted for longitudinal movement, as aforesaid, and in this instance the shaft is provided with a sleeve 55 that is also slidably mounted in the housing bore. This sleeve is provided with teeth 55a enmeshing with a pinion gear 56 secured to a shaft 57 mounted for rotative movement in the housing 10. A lever 58, in this instance, is secured to the outer face of the shaft 57. This lever is provided with a spring pressed detent pin 59 adapted to engage in a series of suitable depressions 59a formed in the unit housing.

Clutch operation

As the pinion 56 and shaft 57 are rotated in the direction of the arrow, by means of the lever 58, the spring 41 is compressed and forced against the yoke member 37 which in turn, through the worm 30 and annulus 24 and the intermediate connections, cause the truncated cone 23 to be forced into engagement with the driving cone 14. The depressions 59a for the lever detent pin 59 are so arranged and spaced that the lever 58 may be positioned as required to compress the spring 41 so as to effect a desired degree of pressure on the engaging elements.

As the lever 58 is moved to cause converse movement of the actuating pinion 56 it is obvious that the pressure exerted by the spring 41 will be released and thus freeing the truncated cone 23 from its engagement, under pressure, with the driving cone 14.

It will be obvious that changes and modifications may be made in the above structure, by those skilled in the art, without departing from the spirit and scope thereof, therefore I do not wish to be limited to the specific details herein disclosed, but what I claim is:—

1. In a device of the character specified, a housing having a power input shaft, a cone member positively rotated by said power shaft, rotatable shafts within said housing and radially spaced relative to the axis of said cone, driving means associated with said shafts, a sleeve bearing member slidably keyed on each of said rotatable shafts, a carriage rotatably supported by each of said sleeves, elements carried by said carriages and adapted to operatively engage with said sleeves and cone member, with means adapted to urge said elements into operative engagement with said cone member, and means associated with said carriage to effect a combined rocking and longitudinal movement of said carriage through infinitesimal increments relative to and along the face of said cone.

2. In a device of the character specified which includes a cone member having a fixed rotative axis, a rotatable member having a fixed axial position relative to said cone axis, a truncated cone adapted to operatively engage with said first cone, driving connection associated with said truncated cone and said rotatable member with operative means for moving said driving connections and truncated cone simultaneously, in a rocking and longitudinal direction relative to and along the face of said rotatable member, with resiliently operated means urging said truncated cone into frictional engagement with said first cone.

3. A device of the character specified which includes a driving and a driven shaft, a cone member actuated by one of said shafts, driving connections disposed between said driving and driven shafts and including a second cone adapted to operatively engage in driving relation with said first cone, an annulus moveably disposed relative to the axis of said cone, engaging teeth in the outer face of said annulus with rotative means meshing with said teeth to effect a combined rotative and longitudinal movement of said annulus, engaging teeth in the inner face of said annulus, an element pivotally supported and having teeth meshing with said last teeth, driving connections associated with said element and said cone and whereby said driven shaft is rotated.

4. A device of the character specified which includes a driving shaft, a driven shaft and a cone member actuated by one of said shafts with means for operatively connecting said cone member and shafts that includes a parallel radially spaced intermediate shaft, provided with driving connections between said intermediate shaft and one of said shafts, driving connections between said cone and intermediate shaft, said last driving connection having a combined rocking and longitudinal through infinitesimal increments movement relative to the face of said cone with a single control means for simultaneously effecting said movement in direct relation to the face of said cone.

5. A device of the character specified which includes a driving shaft, a driven shaft and a cone member actuated by one of said shafts with means for operatively connecting said cone member and shafts that includes a parallel radially spaced intermediate shaft, provided with driving connections between said other shafts, a spring pressed driving connection between said cone and intermediate shaft, said last connection having a combined rocking and longitudinal through infinitesimal increments movement relative to the face of said cone with a single control means for simultaneously effecting said movement in a direct relation to the face angle of said cone.

6. A device of the character specified which includes a housing having a driving and a driven shaft, a cone member disposed within said housing and actuated by one of said shafts, an annulus mounted within said housing and adapted for movement therein and relative to said cone and the axis thereof, engaging teeth in the outer and inner faces of said annulus with rotative means meshing with said outer teeth to effect a simultaneous rotative and longitudinal movement of said annulus relative to said cone, a plurality of shafts rotatably mounted in said housing and having driving connections with said driven shaft, said shafts being radially disposed in a fixed position relative to the axis of said cone and within said annulus, a driving unit slidably secured to each of said last shafts and adapted to operatively engage in a driving relation with said cone, engaging teeth carried by each of said units and meshing with said inner annulus teeth and connections whereby movement of said annulus actuates and selectively positions said units in driving engagement along the face of said cone.

7. A device of the character specified having a control for varying the speed thereof which includes an annulus adapted for rotative and longitudinal movement, a circular segmental rack formed in opposed side faces of said annulus, spur pinions meshing with each of said racks, a helical gear segment formed in said annulus, a worm meshing with said last segment said worm being mounted on a rotatable shaft with means for rotating said shaft, driving connections between said shaft and said spur pinions and whereby rotative movement of said shaft effects a combined rotative and longitudinal movement of said annulus.

8. A device of the character specified in claim 7 wherein said worm is slidably mounted on said rotatable shaft with means for rotating said shaft, a slidable yoke member for said worm with pressure means urging said yoke in one direction.

9. A device of the character specified having a control for varying the speed thereof which includes an annulus adapted for rotative and longitudinal movement, engaging teeth in said annulus, a member having teeth meshing with said annulus teeth with means for rotating said member, pressure means adapted, through engagement with said member, to urge said annulus in a substantially rotative direction with manually operated elements for actuating said pressure means into and out of operative engagement.

10. A device of the character specified having a control for varying the speed thereof which includes an annulus adapted for rotative and longitudinal movement, engaging teeth in said annulus, a member having teeth meshing with said annulus teeth with means for rotating said member, variable pressure means for said member with manually controlled elements for actuating said pressure means.

11. A driving shaft and a driven shaft in a parallel spaced relation, a cone member actuated by one of said shafts, a pinion slidably keyed to the other of said shafts, a carriage engaging with said pinion and rockable about said pinion shaft, intermediate driving connections carried by said carriage and adapted to operatively engage with said cone, and said pinion, engaging teeth integral with said carriage, an annulus disposed about said pinion shaft and having teeth meshing with said carriage teeth with means for actuating said annulus in a combined rotative and longitudinal direction and whereby said carriage and its associated driving connections are selectively positioned relative to said cone.

12. A driving shaft and a driven shaft in a parallel spaced relation, a friction cone member actuated by one of said shafts, a pinion slidably keyed to the other of said shafts, driving connections including a friction element associated with said pinion and adapted to engage said pinion and said cone, elements associated with said driving connections and having engaging teeth enmeshing with one another with means for effecting a combined rocking and longitudinal movement of said elements and driving connections relative to said cone.

13. The elements as recited in claim 12 together with pressure means urging said elements in one direction.

14. A device of the character specified having a control for varying the speed thereof which includes an annulus adapted for rotative and longitudinal movement, engaging teeth in the outer face of said annulus with means engaging said teeth and whereby said annulus is actuated, toothed segments having a bearing within said annulus with yielding elements in engagement with said segments.

15. In a device of the character specified, a power input and a separate power output shaft, a cone member secured to one of said shafts, a plurality of rotatable carriage shafts radially spaced and disposed relative to said input and output shafts, pinion gears secured to each of said radially spaced carriage shafts and meshing with a gear secured to said output shaft, a carriage movably supported on each of said radially spaced carriage shafts, a pinion rotatably supported in each of said carriages operatively engaging with said carriage shaft, and each of said pinions meshing with a second pinion rotatably supported in each of said carriages, said second pinions each having a cone member adapted to closely engage with the peripheral face of the first cone member whereby said carriage shafts are rotated, an annulus in operative engagement with said carriages with means for effecting a combined rotative and longitudinal movement of said annulus in a direct relation to the peripheral face of said first cone.

16. A device of the character specified which includes a housing having a driving shaft and a shaft to be driven, and a plurality of radially spaced intermediate shafts rotatably disposed within said housing, said intermediate shafts having driving connections operatively engaging with said shaft to be driven, a friction cone member disposed between said intermediate shaft and actuated by said driving shaft, driving connections adapted to operatively engage said cone with said intermediate shaft, said last connections each having a combined rocking and longitudinal movement relative to the face of said cone with a single control means for simultaneously effecting said movement in direct relation to the face angle of said cone.

GORDON L. OLSON.